Patented Aug. 14, 1951

2,564,381

UNITED STATES PATENT OFFICE 2,564,381

SULFUR COLORS OF THE DIOXAZINE SERIES AND METHOD OF PREPARING THE SAME

Gordon Bradbury Robbins, Claymont, Del., assignor to E. I. du Pont de Nemours & Company, Wilmington, Del., a corporation of Delaware No Drawing. Application June 22, 1949,
Serial No. 100,746

7 Claims. (Cl. 260—246)

This invention relates to novel sulfur colors and to a method of preparing the same. For the purpose of this invention, a "sulfur color" may be defined as one soluble in aqueous sodium sulfide, and capable of being applied to fabric by the standard sulfur dye procedure, that is by vatting in an aqueous sodium-sulfide bath, followed by oxidation on the fiber to the insoluble form.

It is known that sulfur dyes are relatively scarce in those portions of the spectrum ranging from orange, through red, to violet. On the other hand, sulfur dyes generally possess the advantages of being easily reducible, hence easily applicable to textile material, and of yielding furthermore, dyeings of good fastness qualities.

Accordingly, it is an object of this invention to produce new sulfur colors of good tinctorial qualities and of desirable shades, especially in the ranges of blue to red and red to orange. Another object is to provide a method for producing sulfur colors of the dioxazine series in general which leads to products of high quality and which is of general applicability, thereby offering a wide choice of shades in the resulting product. Further important objects of this invention will become apparent as the description proceeds.

Sulfur dyes in general possess properties which make them very desirable for commercial purposes. Outstanding among these properties, aside from their low cost, is their relative ease and economy of application. Thus, whereas anthraquinone vat dyes demand relatively expensive reducing agents (sodium hydrosulfite) and careful control of dyeing conditions in order to obtain level dyeings, sulfur dyes are reduced easily by cheap reagents (sodium sulfide) to give level dyeings with a minimum amount of attention to conditions of application. The dyeings from sulfur dyes, though not so fast to light and bleach as the anthraquinone vat dyes, are nearly as fast to washing. The light fastness of sulfur dyes is very good, however, compared to azo dyes, and their wash fastness is much superior to that group. Thus, sulfur dyes answer a definite need for inexpensive dyes of moderately good light fastness combined with very good wash fastness. Finally, sulfur colors are generally marketed in powder form which dissolves readily in the sodium sulfide vat; hence sulfur colors are convenient to transport and to store.

It is clear from the aforegoing considerations that the lack of sulfur colors in certain ranges of the spectrum constitutes a practical want of great commercial significance. It is not merely that the absence of a sulfur red, for instance, deprives the textile manufacturer of the privilege of producing red dyed textiles by the aid of sulfur dyes. But even of greater commercial significance is the fact that the textile dyer is handicapped when he desires to shade available sulfur colors in the direction of red.

Thus, textile dyers, as a rule, do not find it convenient to limit their production to colors or shades available by the marketed dyestuffs of a given class (say sulfur colors). More often, the artist's design calls for the use of a color which is a shade different, one way or another, from a given standard product. To meet the requirement, the given color has to be shaded with another color.

Furthermore, when it is desired to shade say a blue into a reddish-blue, the obvious expedient of adding a red color to the blue is not in practice the best, inasmuch as the brightness of the color may suffer from mixing such diverse shades. A more practical expedient is to shade the blue with a violet; in other words, it is preferable to have the shading color as near as possible to the principal color, so as to avoid undue dullness in the resulting mixture.

The production of sulfur colors which would fill out the missing ranges in the spectrum thus becomes an economic problem not only on its own merit, but also because it would enhance the utility of those ranges of the spectrum which are now available in this field. In spite of its importance, however, this problem has not to my knowledge been solved to date. Red shades in sulfur colors have come to be looked upon by experts as an almost unattainable ideal, while the neighboring ranges of orange and violet have been but poorly satisfied in the art to date.

To the extent that allusion to such colors may be found in the literature, they either require expensive initial materials or complex processes of production, or the resulting color is dull or of very low tinctorial power, making the color highly uneconomical for practical use.

In my copending application Serial No. 53,385 of October 7, 1948, now Patent No. 2,504,153, I have described a method for producing sulfur colors of the dioxazine series by reacting upon dioxazine colors with a special sulfurizing agent comprising the complex addition product of aluminum chloride and sulfur monochloride. This method is excellent for its simplicity and economy, but of course offers no opportunity for controlling the positions of the entering sulfide-vattable groups.

My present invention offers an improvement over said prior process in that I am able to control the location of the sulfide-vattable groups, as well as of any other auxochromic atoms or radicals in the molecule with respect to the fundamental triphendioxazine complex, thereby producing products of highest purity and tinctorial qualities. Also, my present method is of wider applicability and offers a wide choice in the desired structure of the resulting products, and consequently a wide range of shades in the resulting colors. My present method also leads to novel compounds which are structurally different from the compounds described and claimed in my copending application.

The improved process of my present invention synthesizes sulfide-vattable dioxazine colors by joining a triphendioxazine molecule to a non-chromophoric molecule bearing sulfide-vattable groups, by the aid of an amido linkage of the type CO—NR, wherein R stands for hydrogen, methyl or ethyl. Accordingly, the process of this invention starts on the one hand with a triphendioxazine color having two carboxy groups, and on the other hand with an aromatic or heterocyclic primary or secondary amine which is free of water-solubilizing groups, but bears at least one sulfide-vattable group such as the thiocyano radical (SCN) or a polysulfide radical. Condensation of the two is effected by first converting the dicarboxy compound into the corresponding di-(carbonyl halide) compound by the aid of an acid halogenating agent such as thionyl chloride, phosphorus pentachloride or phosphorus trichloride, which dicarbonyl halide may be isolated or reacted directly, in situ, with the selected amine.

To illustrate this point, I may start with any dicarboxy-triphendioxazine, for instance 3,10-dicarboxy-6,13-dichloro-triphendioxazine.

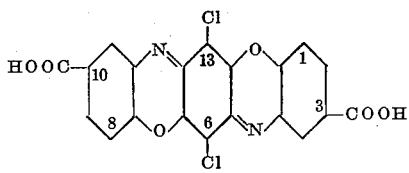

(Example 2 of Fr. Pat. 789,805)

or with 2,9-dicarboxy-6,13-dichloro-triphendioxazine, or with any other convenient triphendioxazine which has two COOH groups, or salts or esters thereof, in the 2,9 or 3,10-positions of the outer phenyl radicals of the triphendioxazine complex. This initial material is subjected by me to the action of an acid halogenating agent, such as thionyl chloride, etc. to convert the COOH groups into COCl groups. The dicarbonyl chloride compound thus obtained may be isolated or reacted in situ with an aromatic or heterocyclic primary or secondary aromatic amine bearing sulfide-vattable groups, whereby to convert the COCl groups into amido groups, thus linking the sulfide-sensitive molecule to the triphendioxazine compound by means of an amido link CONH or CO—N(alk). To illustrate, the amino compound may be—

4-thiocyano-aniline

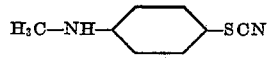

N-methyl-4-thiocyano-aniline

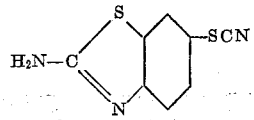

2-amino-6-thiocyano-benzothiazole

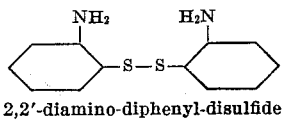

2,2'-diamino-diphenyl-disulfide

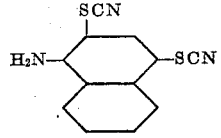

2,4-dithiocyano-1-napthylamine etc.

Accordingly, the novel compounds of this invention may be defined by the general formula

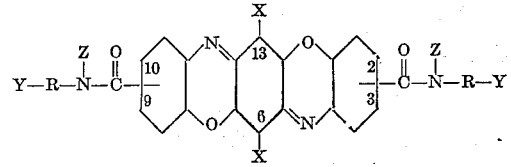

wherein X stands for hydrogen, halogen or methyl, Z stands for hydrogen, ethyl or methyl, Y stands for thiocyano or polysulfide, and R is a radical of the benzene, naphthalene or benzthiozole series, free of water-solubilizing groups (e. g. hydroxy, carboxy or sulfo).

From the viewpoint of ease of synthesis, a preferred subclass under the above general class, is constituted by those compounds wherein R represents a radical of the benzene series bearing a thiocyano group.

My novel compounds are characterized by being soluble in aqueous sodium sulfide, being substantive to cotton from such solution, and being convertible into fast dyeings on the fiber after exposure to air or oxidation in the manner customary with sulfur dyes.

Without limiting my invention, the following examples are given to illustrate my preferred mode of operation. Parts mentioned are by weight.

PART A.—PREPARATION OF THE DYES

*Example I.—Without isolation of intermediate compound*

1 part of 2,9-dicarboxy-6,13-dichloro-triphendioxazine, 0.1 part of pyridine, 26 parts of ortho-dichlorobenzene and 3 parts of thionyl chloride are heated at reflux for 2 hours. Red-brown crystals of the acid-chloride appear during this step. The distillate is then allowed to escape until the temperature of the boiling reaction mixture increases to about 175° C. The reaction mixture is cooled to 100° C. 2.5 parts of pyridine are added, followed by 1 to 1.5 part of 4-thiocyano-aniline. The mixture is heated at 120° to 130° C. for one hour. It is then cooled, diluted with 15 parts of alcohol and the red-brown solid is filtered off, washed successively with alcohol and water, and dried.

*Example II.—With isolation of intermediate COCl compound*

1 part of 3,10-dicarboxy-6,13-dichloro-triphendioxazine, 0.1 part of pyridine, 15 parts of ortho-dichlorobenzene, and 3 parts of thionyl chloride are heated to reflux for 2 hours. The distillate is allowed to escape until the temperature in the reaction mixture reaches 170° C. The mixture is cooled and diluted with 10 parts of petroleum ether. The product, which consists of reddish-orange crystals, is filtered off and washed with petroleum ether. It is then dried, while taking precaution to avoid unnecessary exposure to moisture of the atmosphere.

The acid chloride thus prepared is added to 1.5 parts of 2-methoxy-4-thiocyano-5-chloroaniline in 20 parts of pyridine. The mixture is heated to 100°–110° C. for one hour. It is cooled to 30° C. and diluted with 40 parts of water. The product is filtered off, washed in turn with alcohol and water, and dried at 60°–70° C. A bright, reddish-orange powder is obtained.

*Example III*

One part of 3,10-dicarboxy-6,13-dichloro-triphendioxazine is suspended in 10 parts of orthodichloro benzene. 1.2 parts of phosphorus pentachloride is added and the mixture is heated to reflux for half an hour. 6 parts of solvent naphtha are added, and the charge is cooled and filtered. The product is washed with a little benzene and dried with a minimum exposure to moisture. The product is a reddish-orange crystalline solid.

One part of the acid chloride thus obtained is added to 1.25 parts of 4,4'-diamino-diphenyl disulfide in 10 parts of pyridine. The mixture is refluxed for one half hour. It is drowned in water, filtered and washed with water and then with warm alcohol. The dark orange product dyes cotton a bright orange shade.

*Example IV*

One part of 2,9-dicarboxy-6,13-dichloro-triphendioxazine is reacted with 3.5 parts of thionyl chloride in 10 parts of ortho dichloro benzene and 0.1 part of pyridine at reflux for 2 hours and then excess thionyl chloride is distilled off until the temperature in the reaction mixture has risen from 130°–140° C. to 170°–175° C. The mixture is cooled and diluted with 5 parts of petroleum ether. The product which forms as red-brown crystals during the reaction is filtered off and washed with petroleum ether. It is dried at 100° C. Exposure to moisture is kept at a minimum during the isolation.

One part of the acid chloride prepared above is reacted with one part of 4,4'-diamino-diphenyl disulfide in 20 parts of pyridine at 100°–110° C. for one hour. The mixture is cooled to 40° C. and diluted with 60 parts of water. The dye is filtered off and is washed first with water and then with warm alcohol. The product is a brownish red powder.

*Example V*

One part of the acid chloride from 2,9-dicarboxy-6,13-dichloro-triphendioxazine (prepared as in the preceding example) is added to 1.1 parts of 2-amino-6-thiocyano-benzthiazole (prepared as in Archiv der Pharmazie 266, 210 (1928)) in 20 parts of pyridine, and heated for one hour at 100°–110° C. The product is isolated by diluting the mixture with 60 parts of water and filtering. The dye is washed first with water and then alcohol. The product is a reddish-brown powder.

*Example VI*

One part of the acid chloride from 2,9-dicarboxy-6,13-dichloro-triphendioxazine (prepared as in Example IV) and one part of 6,6'-di(2-aminobenzthiazyl) disulfide, (prepared by caustic hydrolysis of 2-amino-6-thiocyano-benzthiazole) are reacted in 25 parts of pyridine. The mixture is heated to 110°–115° C. for ½ hour. It is then diluted with 50 parts of water. The product is filtered, washed with water and then with hot alcohol.

*Example VII*

One part of the acid chloride from 6,13-dichloro-triphendoxazine-2,9-dicarboxylic acid (prepared as in Example IV) is stirred with 0.75 part of 4,4'-diamino-diphenyl-disulfide in 18 parts of pyridine at 25°–30° C. for 18 hours. The reaction mass is diluted with 18 parts of water and is filtered. The product is washed with water and then with hot alcohol and dried to a red brown powder.

*Example VIII*

One part of the same acid chloride as above is stirred with 0.75 part of 4,4'-diamino-diphenyl disulfide in 40 parts of nitrobenzene and 3 parts of dimethyl aniline at 200°–210° C. for 1 hour. The reaction mass is diluted with 60 parts of alcohol, filtered, washed with alcohol and then with water. The product is dried to a red brown powder.

*Example IX*

One part of the acid chloride of Example IV and 0.75 part of the diamine specified in Example IV are reacted in a mixture of 25 parts of benzene and 1 part of triethylamine at 80° C. for 1 hour. The product is filtered, washed with alcohol and then with water. It is dried to a reddish-brown powder.

*Example X*

One part of 6,13-dichloro-triphendioxazine-3,10-dicarbonyl chloride (prepared as in Example II) and 0.8 part of 2-methoxy-4-thiocyano-5-chloro aniline are heated with 10 parts of pyridine for ½ hour at 85°–95° C. The mixture is diluted with 10 parts of water and filtered. The product is washed with water, then with hot alcohol and dried. A bright orange powder is obtained.

*Example XI*

One part of triphendioxazine-3,10-dicarbonyl chloride is treated with 2,5-dichloro-4-thiocyano-aniline (prepared by thiocyanation of 2,5-dichloro aniline) in 10 parts of pyridine under the same conditions as used in Example X. The product is isolated in the same way to give a yellow-orange powder.

PART B.—APPLICATION TO FIBER

*Example B-1*

A dyebath is made up at 180° F. containing 0.7 part of the dye prepared under Example I, 2 parts of sodium carbonate, 10 parts of sodium sulfide and 30 parts of salt in 2500 parts of water. The red-brown dyestuff dissolves in the bath giving a pale yellow vat. When 100 parts of cotton skein are treated in the vat for one hour, a bright yellow color shows on the skein until it has been squeezed, rinsed, and oxidized in a bath containing 2 parts of sodium dichromate and 4 parts of acetic acid in 2000 parts of warm water. The skein develops a heavy dyeing of an attractive red shade.

In a similar manner, the orange dyestuff prepared under Example II gives a pale vat which leaves the skein nearly white, changing to a bright orange on aftertreatment.

Example B-2

The procedure of Example B-1 is repeated except that the color therein used is replaced by a mixture of 0.2 part of the dye prepared in Example I and 5 parts of a brown sulfur dye prepared by the thionation of 2,7-dimethyl-3,6-diamino-acridine according to U. S. Patent 1,165,531. A brown vat is obtained, dyeing the skein a dark brown, which becomes a very reddish brown on aftertreatment. The dyeing is much redder than that obtainable by using the unshaded brown dyestuff above.

In a similar manner other triphendioxazine compounds having carboxy groups and other amines having sulfide-sensitive radicals may be reacted with each other to form amides. The quantity of amine employed relative to the quantity of triphendioxazine compound may vary considerably, but care should be taken to have a molar excess of the amine. The following table shows various combinations synthesized by us and the shades obtainable from the resulting compounds when dyed upon cotton by the sulfur-dye procedure.

acid acceptor and other features can be varied widely, as will be apparent to one skilled in the art.

I claim as my invention:

1. The process of producing sulfur dyestuffs of the dioxazine series, which comprises reacting, in the presence of a tertiary nitrogenous base, a triphendioxazine compound of the general formula—

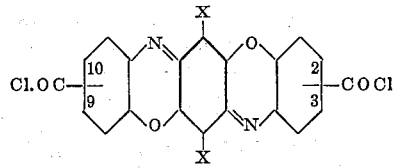

wherein X is a member of the group consisting of hydrogen, halogen and methyl, with a non-chromophoric water-insoluble amine defined by the formula

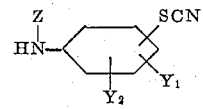

wherein Z is a member of the group consisting of

| Product No. | Acid Component | Amine Component | Shade on Cotton |
|---|---|---|---|
| 1 | 2,9-Dicarboxy-6,13-dichloro-triphendioxazine | 4-Thiocyano-aniline | Red. |
| 2 | ----do---- | 2-Methoxy-4-thiocyano-5-chloro-aniline | Similar to Prod. No. 1. |
| 3 | ----do---- | 2,5-Dichloro-4-thiocyano-aniline | Yellower than Prod. No. 1. |
| 4 | ----do---- | 2,5-Dimethoxy-4-thiocyano-aniline | Bluer than Prod. No. 1. |
| 5 | ----do---- | 2-Amino-6-thiocyano-benzthiazole | Do. |
| 6 | ----do---- | 2-Amino-4,5-benzo-6-thiocyano-benzthiazole | Much bluer than Prod. No. 1. |
| 7 | ----do---- | 2,2-Diamino-diphenyl disulfide | Like Prod. No. 1. |
| 8 | ----do---- | 4,4'-Diamino-diphenyl disulfide | Do. |
| 9 | ----do---- | N-Methyl-4-thiocyano-aniline | Like Prod. No. 1, but weaker. |
| 10 | 3,10-Dicarboxy-6,13-dichloro-triphendioxazine | 4-Thiocyano-aniline | Bright orange. |
| 11 | ----do---- | 2-Methoxy-4-thiocyano-aniline | Like Prod. No. 10. |
| 12 | ----do---- | 2-Methoxy-4-thiocyano-5-chloro-aniline | Like Prod. No. 10, but stronger. |
| 13 | ----do---- | 2,5-Dichloro-4-thiocyano-aniline | Yellower than Prod. No. 10. |
| 14 | ----do---- | 2-Methyl-4-thiocyano-5-chloro-aniline | Like Prod. No. 13. |
| 15 | ----do---- | 4,4'-Diamino-diphenyl disulfide | Like Prod. No. 10. |
| 16 | 2,9-Dicarboxy-3,6,10,13-tetrachloro-triphendioxazine | 4-Thiocyano-aniline | Red. |
| 17 | 2,9-Dicarboxy-6,13-dibromo-triphendioxazine | ----do---- | Do. |
| 18 | 3,10-Dicarboxy-6,13-dibromo-triphendioxazine | ----do---- | Orange. |
| 19 | 2,9-Dicarboxy-6,13-dichloro-triphendioxazine | 4,4'-Diamino-2,5,2',5'-tetrachloro-diphenyl disulfide. | Yellower than Prod. No. 1. |
| 20 | ----do---- | 4,4'-Diamino-2,2'-dichloro-5,5'-dimethyl diphenyl disulfide. | Similar to Prod. No. 1. |
| 21 | ----do---- | 2,4-Dithiocyano-1-naphthylamine | Bluer than Prod. No. 1. |
| 22 | ----do---- | 2-Amino-4-methoxy 6-thiocyano-benzthiazole. | Do. |
| 23 | ----do---- | 6,6'-Di(2-amino-benzthiazyl) disulfide | Bluer than Prod. No. 1. |
| 24 | ----do---- | 4,4'-Diamino-2,2'-dichloro-5,5'-dimethoxy-diphenyl disulfide. | Similar to Prod. No. 1. |
| 25 | ----do---- | 4,4'-Diamino-5,5'-dimethyl-diphenyl disulfide. | Yellower than Prod. No. 1. |
| 26 | ----do---- | 2-Amino-4-methyl-6-thiocyano-benzthiazole. | Bluer than Prod. No. 1. |

It will be understood that the above examples are merely illustrative and that the details may be varied widely by those skilled in the art. For instance, the quantity of inert solvent may be varied considerably, being limited only on one side by the requirement to make the reaction-mass stirrable and on the other side by excessive losses of product due to solubility. The solvent used can be varied among a large number of different liquids which possess no reactive groups and possess a satisfactory boiling point, such as toluene, xylene, nitrobenzene and trichlorobenzene. The relative desirability of these solvents varies with their boiling points and solvent action on the final products.

Temperature, halogenating agent, use of an hydrogen, ethyl and methyl, and each of the Y's represents a member of the group consisting of hydrogen, chlorine, methyl and methoxy, whereby to effect condensation between said triphendioxazine compound and said amine, forming the corresponding bis-amide.

2. The process of producing sulfur dyestuffs of the dioxazine series, which comprises heating 6,13 - dichloro-triphendioxazine - 2,9-di(carbonyl chloride) in the presence of pyridine with two molecules of a thiocyano-aniline to produce the corresponding bis-amide.

3. The process of producing sulfur dyestuffs of the dioxazine series, which comprises heating 6,13-dichloro-triphendioxazine - 3,10-di(carbonyl chloride) in the presence of pyridine with two molecules of a thiocyano-aniline to produce the corresponding bis-amide.

4. Sulfur dyestuffs of the dioxazine series characterized by the general formula

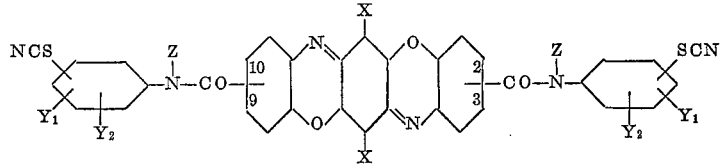

wherein X is a member of the group consisting of hydrogen, halogen and methyl, Z is a member of the group consisting of hydrogen, ethyl and methyl, and each of the Y's represents a member of the group consisting of hydrogen, chlorine, methyl and methoxy.

5. The bis - 4'-thiocyanoanilide of 2,9 - dicarboxy-6,13-dichloro-triphendioxazine.

6. The bis - 2'-methoxy - 5'-chloro - 4'-thiocyanoanilide of 3,10-dicarboxy - 6,13 - dichloro-triphendioxazine.

7. The bis - 2',5'-dichloro - 4'-thiocyanoanilide of 3,10-dicarboxy-6,13-dichloro-triphendioxazine.

GORDON BRADBURY ROBBINS.

REFERENCES CITED

The following references are of record in the file of this patent:

UNITED STATES PATENTS

| Number | Name | Date |
|---|---|---|
| 2,355,497 | Zwilgmeyer | Aug. 8, 1944 |

FOREIGN PATENTS

| Number | Country | Date |
|---|---|---|
| 223,481 | Great Britain | Oct. 23, 1924 |
| 454,302 | Great Britain | Sept. 25, 1936 |